(12) United States Patent
Yosef et al.

(10) Patent No.: US 7,967,889 B2
(45) Date of Patent: Jun. 28, 2011

(54) SOLUBLE AND SOLUBILIZING, FREE-FLOWING, SOLID FERTILIZER COMPOSITIONS, AND THE PREPARATION THEREOF

(75) Inventors: Alexander Yosef, Arad (IL); Yakkov Oren, Beer Sheva (IL); Yair Yagil, Omer (IL)

(73) Assignee: Rotem Amfert Negev Ltd., M.P. Arava (IL)

( * ) Notice: Subject to any disclaimer, the term of this patent is extended or adjusted under 35 U.S.C. 154(b) by 373 days.

(21) Appl. No.: 12/280,838

(22) PCT Filed: Mar. 8, 2007

(86) PCT No.: PCT/IL2007/000300
§ 371 (c)(1),
(2), (4) Date: Oct. 20, 2008

(87) PCT Pub. No.: WO2007/102159
PCT Pub. Date: Sep. 13, 2007

(65) Prior Publication Data
US 2009/0071212 A1    Mar. 19, 2009

(30) Foreign Application Priority Data
Mar. 9, 2006    (IL) .......................................... 174212

(51) Int. Cl.
*C05B 7/00*    (2006.01)

(52) U.S. Cl. .......... 71/33; 71/34; 71/48; 71/50; 423/308; 423/309

(58) Field of Classification Search ................ 71/33, 34, 71/308, 309, 312, 313, 48, 50; 423/308, 423/309, 312, 313
See application file for complete search history.

(56) References Cited

U.S. PATENT DOCUMENTS

| 1,858,230 | A  | * | 5/1932  | Walton et al. ...................... 71/24 |
|-----------|----|---|---------|------------------------------------------|
| 3,832,154 | A  |   | 8/1974  | Hignett et al.                           |
| 4,678,649 | A  | * | 7/1987  | Alexander et al. ............. 423/308  |
| 4,836,995 | A  | * | 6/1989  | Manor et al. ................... 423/309 |
| 6,051,200 | A  | * | 4/2000  | Glascock et al. .............. 423/309  |
| 7,828,871 | B2 | * | 11/2010 | Josef et al. ........................ 71/36 |
| 2002/0129632 | A1 |   | 9/2002 | Sheppardson et al.                       |
| 2003/0029211 | A1 | * | 2/2003 | Sheppardson et al. ............ 71/33   |
| 2005/0119124 | A1 |   | 6/2005 | Alyeshmerni                              |
| 2006/0243012 | A1 | * | 11/2006 | Josef et al. ........................ 71/33 |

FOREIGN PATENT DOCUMENTS
WO        0174740    10/2001

* cited by examiner

*Primary Examiner* — Wayne Langel
(74) *Attorney, Agent, or Firm* — Roach Brown McCarthy & Gruber, P.C.; Kevin D. McCarthy

(57) ABSTRACT

A solid free-flowing particulate fertilizer composition is provided, as well as a method of manufacturing same. The composition has low tendency to caking, is easy for storage and manipulation, dissolves rapidly and completely in water, and can be used directly as a fertilizer or serves in the preparation of concentrated aqueous fertilizer compositions comprising otherwise scarcely soluble nutrients.

18 Claims, No Drawings

US 7,967,889 B2

SOLUBLE AND SOLUBILIZING, FREE-FLOWING, SOLID FERTILIZER COMPOSITIONS, AND THE PREPARATION THEREOF

CLAIM OF PRIORITY

This application claims priority as a 371 of international PCT/IL2007/000300, filed on Mar. 8, 2007; which further claims priority to Israeli patent application serial number 174212, filed on Mar 9, 2006.

FIELD OF THE INVENTION

The invention relates to a solid free-flowing particulate fertilizer composition and to a method of manufacturing same, comprising phosphoric acid in mixture with monopotassium phosphate in a sub-equimolar ratio. The solid composition is used directly as a fertilizer or is used in the preparation of concentrated aqueous fertilizer compositions comprising otherwise scarcely soluble nutrients.

BACKGROUND OF THE INVENTION

Numerous agricultural applications require agrochemical compositions which, while providing necessary nutrients, yield concentrated aqueous solutions without forming precipitates in stock solutions, and which do not leave harmful or useless deposits in the soil. U.S. Pat. No. 5,395,418 describes fertilizer compositions containing urea phosphate with additional important nutrients such as calcium. The fertilizer compositions containing urea phosphate provide a sufficiently low pH to prevent the precipitation of solid materials and turbidity, but the use of urea or urea phosphate is not free of disadvantages. There are situations, e.g. in some greenhouse applications, when it is not permitted to introduce urea, or when urea is not an optimal nitrogen source, like in soilless mixes for orchids in which the urea-breaking bacteria may be missing, Furthermore, solutions of fertilizer compositions containing urea are more turbid then is desirable in some uses. Sometimes high amounts of nutrients, such as magnesium, are required in urea-free environment, or in other cases phosphorus and potassium (PK)-containing compositions are needed. It is therefore an object of this invention to provide a PK fertilizer composition which dissolve rapidly and completely in water, providing solutions that do not suffer from turbidity or precipitation of solid substances even in the presence of high concentrations of other important component, such as salts of various metals.

It is another object of this invention to provide a solid, particulate, composition easy for storage and manipulation.

It is still another object of this invention to provide compositions which form solutions that remain clear even when containing calcium nitrate or magnesium nitrate or calcium phosphate, together with salts of metals such as Zn, Fe, Cu, Mn, Mo, and the like.

It is a further object of this invention to provide compositions which can be stored without losing the aforesaid properties.

It is a still further object of this invention to provide a solid particulate fertilizer composition, that can be used in preparing clear aqueous stock solutions containing available PK with other nutrients selected from metal salts.

This invention also aims at providing a method of manufacturing solid, free-flowing, non-caking particulate fertilizer compositions, which provide stable aqueous solutions, clear even in the presence of high concentrations of calcium or magnesium ions.

Other purposes and advantages of this invention will appear as the description proceeds.

SUMMARY OF THE INVENTION

The invention provides a solid particulate fertilizer composition containing from about 35 wt % to about 41 wt % of phosphoric acid (PA), and from about 59 wt % to about 65 wt % of monopotassium phosphate (MKP), which composition yields at the room temperature a clear aqueous solution at a concentration of up to 150 gram per liter of solution (g/l), in the presence of calcium or magnesium nitrate in a concentration of up to 150 g/l. Said solid particulate fertilizer composition contains water preferably in a concentration of from 0.1 to 0.6 wt %, more preferably from 0.2 to 0.5 wt %. The fertilizer composition of the invention yields a clear aqueous solution at a concentration of up to 150 g/l also when calcium nitrate and magnesium nitrate are present simultaneously, each in a concentration of up to 150 g/l. The above solubility values relate to the room temperature, which may comprise a temperature from 10 to 35° C., usually about 25° C. A solid particulate fertilizer composition according to the invention provides phosphorus and potassium, and is intended for uses either separately or together with other components, preferably in clear solutions containing said particulate solid composition and metal salts. The content of phosphorus in said solid composition, expressed as $P_2O_5$ moiety, is preferably in the range of 58.5-60.5 wt %, and the content of potassium in said solid composition, expressed as $K_2O$ moiety, is preferably in the range of 19.5-22.5 wt %. The solid particulate fertilizer composition according to the invention is a free-flowing material. The composition is preferably granular material with suitable hygroscopicity, for example from about 60 to about 65%, when expressed as C.R.U. The solid composition according to the invention may be mixed with calcium or magnesium nitrate and with water to produce a clear solution containing up to about 1.3 mol/l phosphate ions beside up to about 1.0 mol/l magnesium or calcium ions without the formation of precipitates. In a preferred embodiment of the invention, said solid composition in an amount of from 1 to 150 g/l is dissolved in water together with from 1 to about 160 g/l of calcium nitrate. In other preferred embodiment of the invention, said solid composition in an amount of from 1 to 150 g is dissolved in water together with from 1 to about 150 g of magnesium nitrate.

The invention relates to the use of a solid particulate fertilizer containing from about 35 wt % to about 41 wt % of PA, and from about 59 wt % to about 65 wt % of MKP, and further less than about 0.6 wt % water, in the preparation of a clear, stable, aqueous stock solution comprising from 1 to 150 g/l of said solid composition and further nutrients selected from the group consisting of calcium nitrate, calcium phosphate, magnesium nitrate, and salts of magnesium, iron, manganese, copper, zinc, and molybdenum. The use of the invention comprises preparing stock solutions to be used as fertilizers later, either directly or after dilution. In an important aspect of the invention, the use of the solid composition comprises preparing aqueous stock solutions to be used as components in the preparation of other fertilizers or fertilizer compositions, preferably said fertilizers or fertilizer compositions containing nutrients selected from calcium nitrate, calcium phosphate, magnesium nitrate, salts of magnesium, iron, manganese, copper, zinc, and molybdenum; said fertilizers or fertilizer compositions may, for various applications, as a skilled person will understand, necessitate the inclusion of other materials, such as other nutrients, micronutrients, color adjusting agents, etc. The use of the invention takes advantage of the fact that said aqueous stock solutions, to be used as a fertilizer or as a component in the preparation of a fertilizer, are stable against the formation of precipitates, as well as against the growth of microorganisms. No chelating agents are needed for introducing the metal nutrients to the compositions of the invention.

The invention is directed to the process of manufacturing a solid particulate fertilizer composition containing potassium and phosphorus, expressed as $P_2O_5$ and $K_2O$ moieties, in the ranges of 58.5-60.5 wt % and 19.5-22.5 wt %, respectively, which fertilizer dissolves in water at the room temperature at a concentration of up to 150 g/l, in the presence of magnesium or calcium nitrate in a concentration of up to 150 g/l, to yield a clear solution, said method comprising i) providing technical or food grade phosphoric acid (PA), preferably containing at least 50 wt % of $P_2O_5$ moiety, most of the impurities being essentially water; ii) providing monopotassium phosphate (MKP); iii) mixing said PA and said MKP with water, in any order, and heating under stirring to a temperature of from about 65 to about 90° C. until a clear solution is obtained, wherein the initial amount of water in the mixture, including water added as impurities with said PA and said MKP, preferably constitutes from 5 to 20 wt % of the mixture, and the weight ratios of said MKP to said PA, calculated on dry basis, is from about 1.4 to about 1.9; iv) the solution of step iii) is subjected to the evaporation under vacuum at a temperature of about 100 to about 120° C. under continual stirring, until a homogeneous solid particulate material is obtained, containing from 0.1 to 0.6 wt % water, preferably from 0.2 to 0.5 wt %; iii) cooling the mixture to obtain a free-flowing particulate solid.

DETAILED DESCRIPTION

It has now been found that phosphoric acid (PA) and monopotassium phosphate (MKP) in a certain ratio can be processed into a granular solid, easily manageable, free-flowing, with the desired level of hygroscopicity, with low tendency to caking, in a process which includes preparing an aqueous liquid phase followed by removing most of the water from said phase by vacuum evaporation at temperatures higher than 100° C. The granular solid is advantageously used as a fertilizer or in the preparation of fertilizers. It has been found that the content of PA in the mixture of PA and MKP is advantageously in a narrow range of from 35 wt % to 41 wt %, providing a solid fertilizer with advantageous features.

Various fertilizers were described, comprising phosphoric acid (PA) and monopotassium phosphate (MKP). WO 01/74740, having common inventors with the instant invention, provides a composition containing PA and MKP in the equimolar amounts, and a method of manufacturing it, comprising the formation of crystals of double salt $KH_5(PO_4)_2$. The instant invention does not include crystallization and crystal separation, the manufacturing procedure being simpler in this invention, providing a product without inherent water component, such as crystal water, the product, comprising a sub-equimolar content of PA, being free-flowing and less hygroscopic, without tendency to caking.

The above optimal content of PA in the solid composition of 35-41 wt % corresponds to a molar ratio PA/MKP of 0.8-0.9. Without committing ourselves to theoretical considerations, it seems that this sub-equimolar ratio may contribute to the amorphous character of the obtained solid, which is advantageous in the present context, thus avoiding possible problems, such as those associated with inherent water, and similar phenomena.

The invention provides a well soluble particulate solid, which is easily used as a potassium and phosphorus source, either directly used for fertilizing or used in preparing solid or liquid preparations, wherein the advantageous properties of the particulate solid are fully utilized when preparing aqueous solutions, because the solid of the invention dissolves completely and quickly, and provides aqueous solutions which have high capacity for dissolving further nutrients which may be added to the mixture in any order. Such nutrients are preferably selected from among calcium nitrate, calcium phosphate, magnesium nitrate, and additional salts of magnesium, and salts of iron, manganese, copper, zinc, and molybdenum. The particulate solid of the invention provides suitable pH values, usually between 2.2 and 2.8, when dissolved in water, enabling to include important metal nutrients without chelating agents. When relating to 150 g/l calcium or magnesium nitrate, the intention is not only to use such a mixture as a fertilizer, but, in one aspect, to demonstrate the high solubilizing capacity of the solid composition according to the invention, because combinations of phosphate and calcium, in other contexts incompatible, provide clear solutions in this invention. Of course, for practical purposes, a skilled person will choose any composition, whether with cited high concentrations, or with any lower concentrations, according to the need. The particulate, free-flowing solid fertilizer of the invention, thus, provides an easy-to-use means for a variety of agricultural aims, including providing a solid source of quickly available PK, providing a concentrated liquid PK source with other nutrients, providing a solubilizing agent for making clear liquid nutrient mixtures, providing concentrated clear liquid NPK mixtures for urea-free applications, etc. An important aspect of the invention is the composition consistency, which, being a free-flowing powder with low tendency to caking, enables easy handling, even after prolonged storage.

The invention provides a process for making solid particulate compositions comprising PA and MKP, the PA constituting from 35 to 41 wt % PA, which compositions are easily used and manipulated. Whether used directly, or together with other nutrients, they provide important components to the soil without forming precipitates in stock solutions, and without causing deposits in the soil. The particulate solid fertilizer is, in one aspect of the invention, used as a solubilizer of otherwise barely soluble or insoluble components. The process of the invention involves the stage of providing at a higher temperature a concentrated liquid phase containing PA and MKP, and the stage of removing the solvent from the mixture while homogenizing it at a higher temperature under vacuum. The process of the invention requires a device ensuring, beside the desired temperatures and pressures, continual stirring in liquid phase which continues also during the transition from liquid to solid phase and afterwards, wherein the parts of said device being in contact with the reaction mixture are resistant to the reactants and to the product.

In a preferred embodiment of the process, a technical PA is provided, and substantially dry monopotassium phosphate is provided, and the materials are mixed in any order with relatively small quantity of water, preferably not exceeding about 20 wt % of the total mixture weight. When calculating the water amount to be added, the water contents of the raw materials are considered, so that the total water in the mixture will be between 5 and 20 wt %. The term technical PA in this invention is intended to include technical grades or food grades, and it relates to a material preferably comprising at least 60 wt % of $H_3PO_4$, for example materials comprising from 55-67 wt % $P_2O_5$, the rest being mainly water, wherein minor amounts of agriculturally acceptable impurities may be present. Said MKP preferably contains less than several wt % water, for example less than 1 wt %, to enable smooth material manipulations. The device for performing the process of the invention ensures the continual homogenization at any temperature in the range used in the process, comprising temperatures from the room temperature to about 125° C. Further, said device enables to cool the reaction mixture when necessary. Finally, a stable and sufficient vacuum must be ensured, providing at least 100 mbar.

By including the PA range of 35 to 41 wt % in the above vacuum-employing procedure, a flexible means is provided for preparing fertilizer compositions, either as water-soluble solids or as concentrated aqueous solutions, either for providing quickly-available PK or for solubilizing less soluble nutrients, either for direct use or as stock solutions, either for urea-free environment or for other purposes.

The following examples illustrate the invention, but are not intended to limit it in any way.

EXAMPLE 1

Technical phosphoric acid (PA), 2436 gram, 62.8 wt % of $P_2O_5$ moiety, was mixed with monopotassium phosphate (MKP), 3366 gram, and with 92 gram water in a stainless steel 7-liter drier-reactor provided with an oil heating system. PA and MKP used herein were products of Rotem Amfert Negev Ltd. The mixture was heated under continuous stirring, 25 rpm, to 90° C. until a clear solution was obtained. The reactor was closed and connected with a vacuum pump, gradually decreasing the pressure to below 100 mbar, while heating the mixture up to a temperature of about 116-118° C., for about 5 hour. A solid with a water content below 0.5 wt % was cooled to about 40° C., and the material was unloaded. The yield was about 4.8 kg of particulate product; after sieving on 2 mm sieves, about 4.7 kg material was obtained, bigger particles being added to the next batch.

The content of water was determined by thermogravimetric analysis, the content of $P_2O_5$ spectrophotometrically, the content of $K_2O$ by potentiometric titration with tetraphenylborate. The hygroscopicity was characterized as the critical relative humidity (C.R.U.), by determining a relative humidity of an environment in which water absorption by the sample causes a mass increase higher than 3%; hygroscopicity of the product was 60-65%, when expressed as C.R.U.

The flowability index was determined by i) filling a smooth funnel of stainless steel closed at the exit, with a top diameter of 100 mm and an exit diameter of 10 mm, with 300 grams of the examined substance, and ii) measuring the time t the substance takes to pass through the exit after its opening. The flowability index FI % was calculated as FI %=100*$(t_0/t)$, wherein $t_0$ is the flow time measured for a standard substance. The FI value of the product was higher than FI of the MKP used in the process.

EXAMPLE 2

In a 30-liter drier-reactor provided with pressurized water-heating system and a shaft stirring system, 12.5 kg of PA of about 67 wt % of $P_2O_5$ moiety was loaded, and 19 kg of MKP, and 4 kg of water. The mixture was stirred, 25 rpm, and heated to 90° C., a clear solution was obtained, the reactor was closed and connected with a vacuum pump, and the mixture was heated and kept at a temperature of about 110° C., at a pressure of about 50 mbar. A solid was obtained, containing 0.4 wt % water, the vacuum was stopped and the temperature lowered to 45° C. A free-flowing particulate material was obtained containing 59.5% of $P_2O_5$ moiety and 21.4% of $K_2O$ moiety. When the particulate solid was dissolved in distilled water, 150 g/l, no precipitate was observed during 1 week period. The hygroscopicity of the product, expressed as C.R.U., was 60-65%. The pH of a 1 wt % solution was 2.4.

EXAMPLE 3

The product obtained in Example 2, was dissolved in water and various amounts of $Ca(NO_3)_2$, $Mg(NO_3)_2$, and metal sulfates were added to reach the required concentrations. The results are compared with compositions in which monoammonium phosphate (MAP) was used instead of the product. Table 1 shows the results. The values mean gram per liter of aqueous solutions, the product of the invention is denoted as Pr.

TABLE 1

Solubility of various combinations of nutrients, either comprising monoammonium phosphate (MAP) or the product of the invention (Pr) in 1 liter of an aqueous solution.

| Example | Precipitate occurred | | No precipitate occurred | |
|---|---|---|---|---|
| A | 2 g MAP | + 100 g $Ca(NO_3)_2$ | 2 g Pr | + 100 g $Ca(NO_3)_2$ |
| B | 10 g MAP | + 10 g $Ca(NO_3)_2$ | 10 g Pr | + 10 g $Ca(NO_3)_2$ |
| C | 100 g MAP | + 100 g $Ca(NO_3)_2$ | 100 g Pr | + 100 g $Ca(NO_3)_2$ |
| D | 10 g MAP | + 10 g $FeSO_4$ | 10 g Pr | + 10 g $FeSO_4$ |
| E | 100 g MAP | + 100 g $FeSO_4$ | 100 g Pr | + 100 g $FeSO_4$ |
| F | 150 g MAP | + 150 g $Ca(NO_3)_2$ + 150 g $Mg(NO_3)_2$ | 150 g Pr | + 150 g $Ca(NO_3)_2$ + 150 g $Mg(NO_3)_2$ |
| G | 110 g MAP 30 g $MnSO_4$ 40 g $ZnSO_4$ | + 100 g $FeSO_4$ + + 10 g $CuSO_4$ + | 100 g Pr 30 g $MnSO_4$ 40 g $ZnSO_4$ | + 100 g $FeSO_4$ + + 10 g $CuSO_4$ + |
| H | 50 g MAP 1 g $FeSO_4$ 0.25 g $CuSO_4$ | + 95 g $Ca(NO_3)_2$ + + 0.5 g $MnSO_4$ + + 0.5 g $ZnSO_4$ | 50 g Pr 1 g $FeSO_4$ 0.25 g $CuSO_4$ | + 95 g $Ca(NO_3)_2$ + + 0.5 g $MnSO_4$ + + 0.5 g $ZnSO_4$ |

While this invention has been described in terms of some specific examples, many modifications and variations are possible. It is therefore understood that within the scope of the appended claims, the invention may be realized otherwise than as specifically described.

The invention claimed is:

1. A solid, free-flowing without tendency to caking, particulate fertilizer composition essentially lacking crystal water comprising an amount of monopotassium phosphate (MKP) and a sub-equimolar amount of phosphoric acid (PA), which fertilizer composition contains from about 35 wt % to about 41 wt % of phosphoric acid (PA), from about 59 wt % to about 65 wt % of monopotassium phosphate (MKP), and from 0.1 to 0.6 wt % of water.

2. A solid, free-flowing, particulate fertilizer composition according to claim 1, which composition yields at the room temperature a clear aqueous solution at a concentration of up to 150 gram per liter of solution (g/l), in the presence of calcium or magnesium nitrate in a concentration of up to 150 g/l.

3. A solid, free-flowing, particulate fertilizer composition according to claim 1, which composition yields at the room temperature a clear aqueous solution at a concentration of up to 150 g/l, in the presence of calcium nitrate in a concentration of up to 150 g/l and magnesium nitrate in a concentration of up to 150 g/l.

4. A solid composition according to claim 1, containing water in a concentration of from 0.2 to 0.5 wt %.

5. A solid particulate fertilizer composition according to claim 1, capable of providing a clear solution containing up to about 1.3 mol/l phosphate ions beside up to about 1.0 mol/l magnesium or calcium ions when mixed with calcium or magnesium nitrate and with water.

6. A solid composition according to claim 5, wherein said clear solution is obtained by mixing up to 150 g of said solid composition, up to about 160 g of calcium nitrate, and water in such an amount so as to complete the volume of the mixture to 1 liter.

7. A solid composition according to claim 5, wherein said clear solution is obtained by mixing up to 150 g of said solid composition, up to about 150 g of magnesium nitrate, and water in such an amount so as to complete the volume of the mixture to 1 liter.

8. A solid composition according to claim 1, containing the following ranges of content moieties: 58.5-60.5 wt % of $P_2O_5$ and 19.5-22.5 wt % of $K_2O$.

9. A method of preparing a clear, stable, aqueous stock solution comprising from 1 to 150 g/l of the solid composition of claim 1 and further nutrients selected from the group consisting of calcium nitrate, calcium phosphate, magnesium nitrate, and salts of magnesium, iron, manganese, copper, zinc, and molybdenum, said method comprising dissolving said solid composition and nutrients in water to reach the required concentrations.

10. The method according to claim 9, wherein said stock solution does not contain a chelating agent.

11. The method of claim 9, wherein said aqueous stock solution being a fertilizer or a component in the preparation of a fertilizer.

12. The method of claim 9, wherein said aqueous stock solution being stable against the formation of inorganic precipitates.

13. The method of claim 9, wherein said aqueous stock solution being stable against the growth of microorganisms.

14. The process of manufacturing a solid particulate fertilizer composition containing phosphorus and potassium, expressed as $P_2O_5$ and $K_2O$ moieties, in the ranges of 58.5-60.5 wt % and 19.5-22.5 wt %, respectively, said process comprising
   i) providing mono potassium phosphate (MKP), and technical phosphoric acid (PA) in a subequimolar amount, most of the impurities being essentially water;
   ii) mixing said PA and said MKP with water, in any order, and heating to a temperature of from about 65 to about 90° C. until a clear solution is obtained, wherein the initial amount of water in the mixture, including water added as impurities with said PA and said MKP, constitutes from 5 to 20 wt % of the mixture, and wherein the weight ratio of said MKP to said PA, calculated on dry basis, is from 1.4 to 1.9;
   iii) subjecting the solution of step ii) to the evaporation under vacuum at a temperature of about 100 to about 120° C. until a solid homogeneous material is obtained containing from 0.1 to 0.6 wt % water; and
   iv) cooling the solid to obtain said solid particulate free-flowing fertilizer.

15. The process of claim 14, wherein said vacuum comprises a pressure of 100 mbar or less.

16. The process of claim 14, wherein said vacuum is applied under stirring that continues during the phase transition from liquid to solid.

17. The process of claim 14, wherein said particulate fertilizer exhibits low tendency to caking.

18. The process of claim 14, wherein said particulate fertilizer dissolves in water at the room temperature at a concentration of up to 150 g/l, in the presence of magnesium or calcium nitrate in a concentration of up to 150 g/l, to yield a clear solution.

* * * * *